(12) United States Patent
Schwartz

(10) Patent No.: US 11,348,407 B2
(45) Date of Patent: May 31, 2022

(54) MARKERS HAVING NON-CASHABLE VALUE

(71) Applicant: Global Payments Gaming Services Inc., Las Vegas, NV (US)

(72) Inventor: Andrew J. Schwartz, Las Vegas, NV (US)

(73) Assignee: Global Payments Gaming Services Inc., Las Vegas, NV (US)

( * ) Notice: Subject to any disclaimer, the term of this patent is extended or adjusted under 35 U.S.C. 154(b) by 0 days.

(21) Appl. No.: 17/030,174

(22) Filed: Sep. 23, 2020

(65) Prior Publication Data
US 2021/0110652 A1 Apr. 15, 2021

Related U.S. Application Data

(60) Provisional application No. 62/913,905, filed on Oct. 11, 2019.

(51) Int. Cl.
G07F 17/32 (2006.01)
G06Q 20/18 (2012.01)
G07F 17/42 (2006.01)

(52) U.S. Cl.
CPC ......... G07F 17/3248 (2013.01); G06Q 20/18 (2013.01); G07F 17/3218 (2013.01); G07F 17/3223 (2013.01); G07F 17/3255 (2013.01); G07F 17/42 (2013.01)

(58) Field of Classification Search
None
See application file for complete search history.

(56) References Cited

U.S. PATENT DOCUMENTS

| | | | | |
|---|---|---|---|---|
| 2008/0026822 A1* | 1/2008 | Walker | ................... | G07F 17/32 463/25 |
| 2008/0213026 A1* | 9/2008 | Grabiec | ................. | G07F 17/32 400/642 |
| 2010/0311496 A1* | 12/2010 | Taylor | ................... | A63F 13/12 463/25 |
| 2021/0082244 A1* | 3/2021 | Schwartz | ............ | G07F 17/3225 |
| 2021/0104118 A1* | 4/2021 | Schwartz | ........... | G06Q 20/0457 |

* cited by examiner

*Primary Examiner* — Ronald Laneau
(74) *Attorney, Agent, or Firm* — Mendelsohn Dunleavy, P.C.; Steve Mendelsohn

(57) ABSTRACT

A computer-based casino gaming system includes a ticket server and a marker server. The ticket server controls generation and redemption of gaming vouchers used for play at gaming machine/tables. The marker server controls granting of non-cashable markers having non-cashable value to casino patrons. When the marker server determines to grant a non-cashable marker requested by a patron, the ticket server generates a first gaming voucher representing a first monetary value corresponding to the non-cashable value. When the patron uses the first gaming voucher for play at a gaming machine/table, the ticket server redeems the first gaming voucher and transmits a message identifying playing credit corresponding to the first monetary value represented by the first gaming voucher and the patron is enabled to play at the gaming machine/table using the identified playing credit. The system ensures that the non-cashable marker is paid back before redeeming any cashable value to the patron.

27 Claims, 3 Drawing Sheets

| ROW | CREDIT LINE | REMAINING CREDIT | ACTIVE MARKERS | AVAILABLE FUNDS | PLAYING CREDITS | CASHABLE VALUE | NON-CASHABLE VALUE |
|---|---|---|---|---|---|---|---|
| 1 | $100 | $100 | $0 | $0 | $0 | $0 | $0 |
| 2 | $100 | $60 | $40 | $40 | $0 | $0 | $40 |
| 3 | $100 | $60 | $40 | $0 | $40 | $0 | $40 |
| 4 | $100 | $60 | $40 | $0 | $0 | $0 | $0 |
| 5 | $100 | $10 | $90 | $50 | $0 | $0 | $50 |
| 6 | $100 | $10 | $90 | $0 | $50 | $0 | $50 |
| 7 | $100 | $10 | $90 | $130 | $0 | $40 | $90 |
| 8 | $100 | $100 | $0 | $0 | $0 | $0 | $0 |
|  |  |  |  |  |  |  |  |
| 5 | $100 | $10 | $90 | $50 | $0 | $0 | $50 |
| 9 | $100 | $50 | $50 | $10 | $0 | $0 | $10 |
| 10 | $100 | $60 | $40 | $0 | $0 | $0 | $0 |
| 11 | $100 | $100 | $0 | $0 | $0 | $0 | $0 |

FIG. 2

MARKERS HAVING NON-CASHABLE VALUE

CROSS-REFERENCE TO RELATED APPLICATIONS

This application claims the benefit of the filing date of U.S. provisional application No. 62/913,905, filed on Oct. 11, 2019, the teachings of which are incorporated herein by reference in their entirety. The subject matter of this disclosure is related to the subject matter of U.S. Pat. No. 8,845,416, and U.S. patent application Ser. No. 16/190,224, the teachings of both of which are incorporated herein by reference in their entirety.

BACKGROUND

Field of the Disclosure

The present invention relates to gaming at casinos and other gaming enterprises.

Description of the Related Art

This section introduces aspects that may help facilitate a better understanding of the disclosure. Accordingly, the statements of this section are to be read in this light and are not to be understood as admissions about what is prior art or what is not prior art.

Casinos and other gaming enterprises (referred to herein collectively as casinos) are known to provide credit lines and markers to certain casino patrons. A marker is an amount of funds drawn against a credit line made available by a casino to a patron. To receive a credit line from a casino, a casino patron typically goes through an application process during which the casino performs a credit check on the patron or otherwise verifies the ability of the patron to pay the casino back at some later time in order to establish a credit limit for the patron. When the patron wants to receive funds corresponding to some or all of the patron's remaining credit line, the patron draws a marker for those funds by executing a financial instrument substantially equivalent to a personal check from the patron that the casino can subsequently use to receive payment for those funds from the patron's bank or credit card account.

Unlike a cash advance on a credit card which can be used to pay for any goods or services, a marker is typically intended to fund only gaming at the casino that provided the marker to the patron. Although markers are intended to fund only gaming, attempts are sometimes made by patrons to thwart the marker system. For example, a patron may draw a marker against his credit line and use the marker's funds to receive playing chips at a gaming table. Although the chips are supposed to be used for gaming at that gaming table, a patron or an associate of the patron may attempt to redeem some or all of those chips at the casino's cashier cage for cash, thereby avoiding using all of the marker funds for gaming. Alternatively, a patron may use some or all of a marker's funds to acquire playing credit at a casino gaming machine such as a slot machine or a poker machine. The patron may cash out from the gaming machine while the patron still has playing credit on the gaming machine and receive a paper voucher that the patron or an associate of the patron attempts to redeem at a casino kiosk or cashier cage in return for cash, again avoiding using all of the marker funds for gaming. Such activities discourage casinos from providing markers to more than only a few, well-known patrons.

SUMMARY

Problems in the prior art are addressed in accordance with the principles of the present disclosure by a casino issuing markers having non-cashable value.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 2 is a table representing the status of a patron's marker record in the marker database for example gaming scenarios involving the gaming system of FIG. 1.

DETAILED DESCRIPTION

Figure 1:
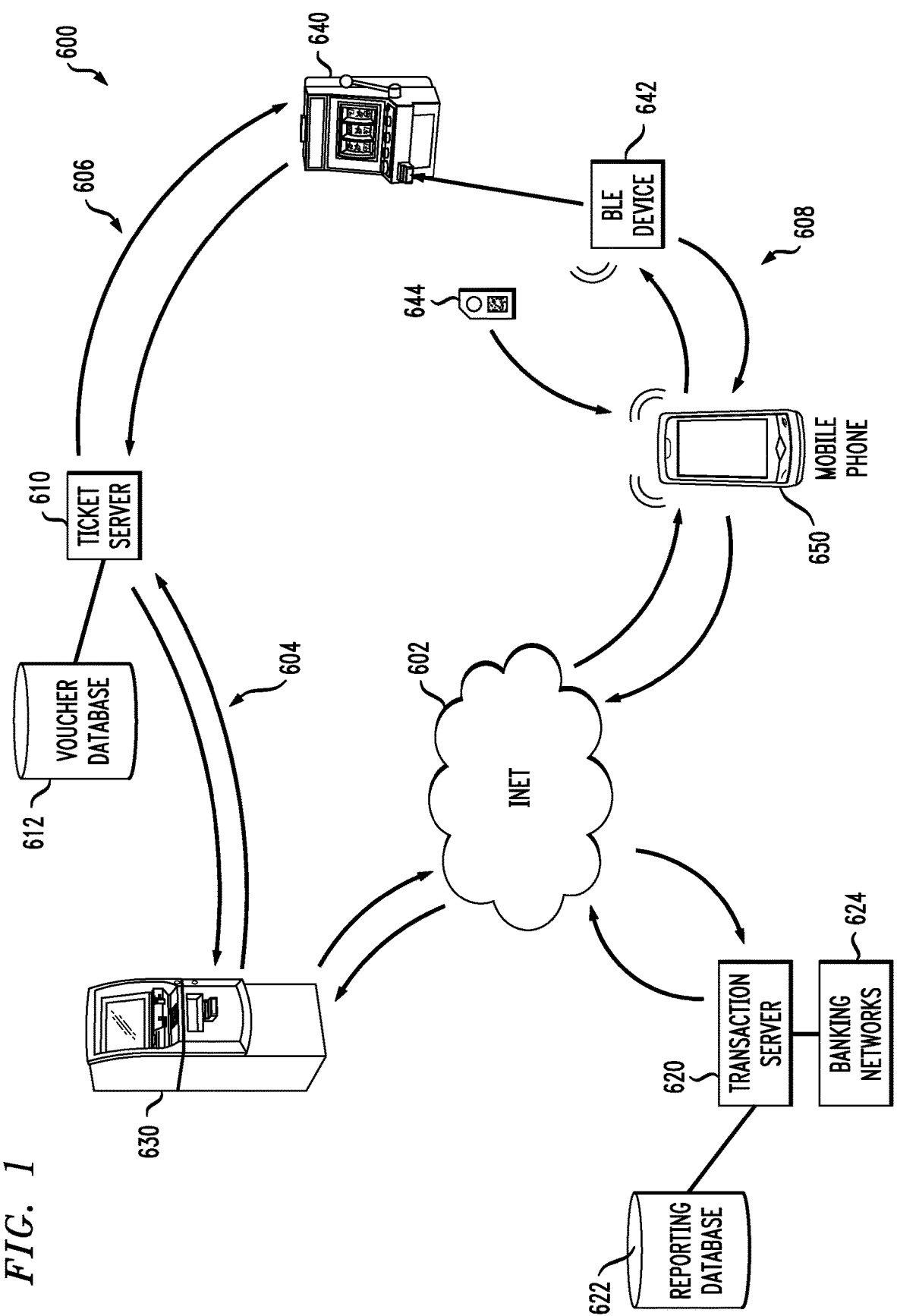
FIG. 1 shows a symbolic diagram representing a distributed network computer gaming system for a casino that supports the funding of play in a casino by establishing lines of credit, draw marker funds from those credit lines to create paper or virtual vouchers, and cash out from casino gaming using paper or virtual vouchers.

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

According to certain embodiments of this disclosure, a casino provides credit lines to patrons and allows the patrons to draw markers having non-cashable value against those existing credit lines, where a marker server in the casino's computer system maintains, for each patron having a credit line, a marker record in a marker database, where the marker record stores information needed to track the following items:

The total monetary value of the patron's credit line(s);
The funds currently available on the patron's credit line(s), referred to herein as "the patron's remaining credit";

The monetary value of each of the patron's currently active markers;

The total funds currently available to the patron, referred to herein as "the patron's available funds";

The amount of the patron's available funds transferred to a casino gaming machine or gaming table, referred to herein as "the patron's playing credits";

The total cashable value available to the patron, referred to herein as "the patron's cashable value"; and The total non-cashable value available to the patron, referred to herein as "the patron's non-cashable value."

Note that the patron's remaining credit is equal to the difference between the total value of the patron's credit line(s) and the total value of the patron's active marker(s). Note further that the sum of the patron's available funds and the patron's playing credits is equal to the sum of the patron's cashable value and the patron's non-cashable value. Note further that the patron's cashable value is equal to the sum of the patron's available funds and the patron's playing credits minus the total value of the patron's active marker(s). In view of the foregoing relationships, the marker server does not need to store all of the above items explicitly in the marker database in order to track all of those items. Different implementations may store different suitable subsets of those items, where any unstored item can be determined at any time based on the stored items.

As described further below, in some implementations, the marker server maintains a separate record for each different active marker. In other implementations, the marker server maintains a single value corresponding to the sum of the monetary values of all of the patron's active markers.

As described further below, in some implementations, the casino computer system is designed to prevent patrons from converting any of their non-cashable value into cash or other freely negotiable monetary value. In other implementations, the casino computer system allows patrons to convert some or all of their non-cashable value into cash or other freely negotiable monetary value, but the casino computer system makes patrons concurrently pay for that non-cashable value in some acceptable manner.

In certain implementations, the marker server is not able to track each bet made by the patron in real time. In those implementations, the marker database is not updated every time the patron places and then wins or loses a bet. Rather, in those implementations, the marker database may be updated when the patron cashes out from a gaming machine or gaming table, when the patron loses all of his playing credits, or when the patron redeems a voucher, e.g., at a kiosk, or chips, e.g., at a casino cage.

In other implementations, the marker server is able to track each bet made by the patron in real time. In those implementations, the marker database may be (but does not have to be) updated every time the patron places and then wins or loses a bet.

Note that a marker does not necessarily involve any physical instrument like a paper voucher or a plastic player card. In some implementations, a marker is a purely virtual entity that exists only as a record in the casino's computer system.

As used herein, the term "cashable value" refers to monetary value that can be redeemed for cash or other freely negotiable monetary value, such as credit applied to a bank account or credit card account or used to purchase any available goods or services, including but not limited to purchasing playing credit or chips for gaming at a casino, while the term "non-cashable value" refers to monetary value that cannot be redeemed for cash or other freely negotiable monetary value. In some implementations, non-cashable value can be redeemed only for gaming at the casino that provided the non-cashable value to the patron. The term "non-cashable marker" refers to a marker whose monetary value is non-cashable. As used herein, the nouns "gaming" and "play" are synonymous when referring to a patron's activity at a gaming machine or gaming table.

The following describes the operations of the marker server with respect to maintaining a patron's marker record in the marker database. With each operation, the marker server automatically updates the patron's marker record accordingly. When a new credit line is approved, the patron's credit line and the patron's remaining credit are increased by the size of the credit line. When the patron draws marker funds from his credit line (up to the patron's remaining credit), the patron's remaining credit is decreased and the patron's active markers, the patron's available funds, and the patron's non-cashable value are increased all by the amount of drawn marker funds. When the patron transfers some or all of his available funds to a gaming machine or gaming table, the patron's available funds are decreased and the patron's playing credits are increased by the amount of the transferred funds.

When the patron cashes out from a gaming machine or gaming table with a non-zero amount of playing credits, the player's playing credits are reset to zero, and the patron's available funds are increased by the monetary value of the cashed-out playing credits. In certain embodiments, the patron has a casino app running on his cell phone (or other suitable mobile device), where the casino app supports the patron's gaming, and the cell phone uses a wireless connection (e.g., a Bluetooth Low Energy (BLE) connection) to communicate with a gaming machine. In those embodiments, the casino app can determine when the patron has terminated play at a gaming machine without cashing out by (i) detecting the loss of the wireless connection resulting from the patron moving away from the gaming machine and/or by (ii) determining that the patron has no more playing credits at the gaming machine. In that case, the casino app transmits a message to inform the marker server that the patron has completed play at that gaming machine, and the marker server resets the patron's playing credits to zero without changing the patron's available funds.

Note that, whenever the patron's available funds are less than or equal to the total monetary value of the patron's active markers, then the patron's non-cashable value is equal to the patron's available funds. However, whenever the patron's available funds are greater than the total monetary value of the patron's active markers, then (i) the patron's non-cashable value is equal to the total monetary value of the patron's active markers and (ii) the patron's cashable value is equal to the patron's available funds minus the total monetary value of the patron's active markers.

At any time, the patron may elect to redeem some or all of his available funds, in which case, the patron's available funds are decreased by the amount of redeemed available funds. Redeemed available funds are first used to pay back the patron's active markers with older active markers being paid back before newer active markers. Note that an active marker can be paid back in full or partially paid back depending on the amount of redeemed available funds. The patron's remaining credit is increased by any amount of redeemed available funds used to pay back active markers. After all of the active markers have been paid back, any additional redeemed available funds are redeemed as cash (or other freely negotiable monetary value).

Note that, in addition to drawing marker funds from existing credit lines, a patron can increase his available funds using other forms of credit, in which case, the patron's available funds are increased by the added credit funds. The use of these other forms of credit is also tracked, although not necessarily by the marker server. Note further that a patron can also increase his available funds using cash or other freely negotiable monetary value, in which case, the patron's available funds are increased by the added cash funds.

When a voucher (virtual or paper) is presented for redemption at a kiosk, casino cage, or table game, the casino computer system determines whether the owner of the voucher has a marker record in the marker server. If so, then the information in the marker record is used to determine how much of the voucher's monetary value is non-cashable value and how much is cashable value so that those values can be taken into account when redeeming the voucher. This implies the use of information identifying the patron who owns the voucher, either by printing identification information on a paper voucher or including identification information in the system's voucher database or both.

With the aforementioned rules, a casino can allow patrons to establish credit lines and draw marker funds against those credit lines while restricting the patrons' use of those marker funds to gaming.

In some embodiments, the marker server creates a marker timer whenever an active marker is drawn on an existing credit line. Whenever the patron's available funds are greater than or equal to the patron's remaining credit, the marker timer is reset to zero. Whenever the patron's available funds are less than the patron's remaining credit, the marker timer is started. The marker timer will continue to run as long as the patron's available funds are less than the patron's remaining credit. If and when the patron's available funds are greater than or equal to the patron's remaining credit while the marker timer is running, then the running marker timer will be reset to zero. If and when the patron's available funds are again less than the patron's remaining credit, then the marker timer is re-started from zero.

A marker timer will expire if it continues to run for a specified timer duration (e.g., 28 days, in one possible implementation). When a marker timer expires, the marker server will automatically take actions to pay off the corresponding active marker. In particular, if the patron has any available funds, then those available funds are automatically used to pay off some if not all of the active marker. If there are not enough available funds to pay off all of the active marker, then the casino exercises other available options for collecting the balance of the monetary value of the active marker from the patron, including charging the patron's credit card account or debiting the patron's bank account.

If a second active marker is drawn while the initial marker timer for an initial active marker is still running, then a second marker timer is created and started for the second active marker. If and when the initial marker timer expires, then the marker server will automatically take actions to pay off the initial active marker. If and when the second marker timer subsequently expires, then the marker server will then automatically take further actions to pay off the second active marker.

If and when the patron's available funds are greater than or equal to the patron's remaining credit while the two marker timers are still running, then the two marker timers are reset to zero. If and when the patron's available funds are again less than the patron's remaining credit, then a single marker timer is started for both active markers. If and when that single marker timer expires, then the marker server will automatically take actions to pay off both active markers.

If and when the patron's available funds are greater than or equal to the value of the initial active marker, but not greater than the sum of the values of the two active markers, while the two marker timers are running, then the initial marker timer will be reset to zero, while the second marker timer continues to run. If and when the second marker timer expires, then the marker server will automatically take actions to pay off the second active marker.

In a conventional procedure, a patron can use a kiosk to generate a paper voucher having a certain cashable value by inserting an equivalent amount of cash into the kiosk or by requesting the transfer of an equivalent amount of funds from the patron's bank or credit card account. In response, the kiosk will transmit a voucher request to the ticket server for that monetary value. The ticket server will create (i.e., generate) a new voucher by assigning and storing a unique voucher ID number along with the associated monetary value in a new voucher record in the voucher database. The ticket server will transmit a message back to the kiosk identifying the assigned voucher ID number, and the kiosk will print and dispense to the patron a paper voucher having printed on it the monetary value as well as a barcode symbol that represents the assigned voucher ID number.

The patron can then redeem the paper voucher at a gaming machine by inserting the paper voucher into the voucher receiver of the gaming machine to receive playing credit equivalent to the monetary value of the paper voucher for playing at the gaming machine. In particular, the gaming machine scans and decodes the barcode symbol printed on the paper voucher and transmits a voucher redemption request to the ticket server identifying the decoded voucher ID number, which the ticket server uses to retrieve the corresponding monetary value from the voucher database. The ticket server transmits a message back to the gaming machine identifying the retrieved monetary value and updates the voucher record in the voucher database to indicate that there is now zero monetary value associated with the voucher ID number of that now-redeemed voucher. Alternatively, in some implementations, the ticket server simply deletes the voucher entry from the voucher database. In any case, the gaming machine provides to the patron playing credit equivalent to the received monetary value for playing the gaming machine.

As the patron plays the gaming machine, the gaming machine increases and decreases the level of playing credit as the patron wins and loses. If and when the patron is done playing at the gaming machine while still having remaining playing credit, the patron engages a (physical or displayed) "cash out" button of the gaming machine to cash out from the gaming machine. In a procedure analogous to that performed by a kiosk, the gaming machine transmits a voucher request message identifying a monetary value corresponding to the remaining playing credit to the ticket server, which creates a new voucher record in the voucher database and returns the assigned voucher ID number to the gaming machine, which prints and dispenses a corresponding paper voucher to the patron.

Here, too, the patron can redeem the new paper voucher at another gaming machine. Alternatively, the patron can redeem the paper voucher at a kiosk. In a procedure analogous to that performed by a gaming machine, the kiosk scans and decodes the barcode symbol on the paper voucher and transmits a voucher redemption request identifying the decoded voucher ID number to the ticket server, which uses the received voucher ID number to retrieve the monetary value associated with the voucher from the voucher database and updates the voucher record to reflect that the voucher is now redeemed. Since the monetary value associated with this conventional voucher is cashable, depending on what the patron requested, the ticket server can either credit the monetary value associated with the voucher to the patron's bank or credit card account or the ticket server can transmit a message identifying the monetary value back to the kiosk, which can then dispense cash to the patron equivalent to that monetary value.

In addition to using paper vouchers to fund play at gaming machines, embodiments of the disclosure can be implemented in the context of using virtual vouchers to fund play at gaming machines, such as (without limitation) slot machines and poker machines, or at gaming tables for such games as (without limitation) blackjack, poker, roulette, craps, and baccarat. In certain implementations, instead of using a kiosk to generate a paper voucher, a patron has a casino application (aka casino app) that runs on his cell phone or other suitable wireless device, where the casino app enables the wireless device to communicate with the casino computer network to generate a virtual voucher.

As used herein, the term "virtual voucher" refers to a non-physical voucher having a voucher ID and an associated monetary value, but that does not involve the printing of a code symbol onto a piece of paper (or other physical substrate). In particular, for virtual vouchers, a gaming machine is capable of performing an electronic (i.e., paperless) cash-in operation in which a patron uses a wireless device running the casino app to wirelessly transmit to a gaming machine the unique voucher ID associated with a previously created virtual voucher. The gaming machine will then communicate with the ticket server to redeem the virtual voucher in return for playing credit on the gaming machine equivalent to the monetary value of the virtual voucher. The gaming machine is also capable of performing an electronic cash-out operation in which the gaming machine communicates with the ticket server to create a new virtual voucher corresponding to some or all of the playing credit remaining on the gaming machine and then transmit to a patron's wireless device the unique voucher ID and monetary value for the virtual voucher. In some implementations, cashing out can involve the generation of a paper voucher instead of a virtual voucher.

According to certain embodiments of this disclosure, a patron can also use the casino app to establish a credit line and then draw marker funds against that credit line. In particular, according to certain implementations, to establish a credit line, a patron uses the casino app request a credit line of a specified non-cashable monetary value. The casino app transmits a credit line creation request to the marker server which determines whether to grant the request for a credit line of that specified monetary value. Depending on the implementation, the marker server may communicate with one or more appropriate financial institutions outside of the casino about the patron's credit rating to determine whether to grant the request for the credit line. According to some implementations, if the request for a credit line of the specified monetary value is denied, the marker server may determine a lesser amount of non-cashable monetary value that it is willing to extend as a credit line to the patron.

As mentioned previously, when a credit line is established, the computer server creates a marker record in the marker database for the patron.

In certain implementations, after a credit line has been established, the patron can use the casino app to draw a requested amount of marker funds up to the patron's remaining credit on his credit line. The casino app transmits a credit line status request identifying the patron to the marker server, which uses the identity of the patron to confirm that the patron has an existing credit line in the marker database and retrieve from the patron's marker record in the marker database the value of the patron's remaining credit, if any. The marker server transmits that information to the casino app, which displays the patron's remaining credit on the patron's cell phone.

The patron can then use the casino app to transmit to the marker server a marker request identifying a specified monetary value of marker funds up to the patron's remaining credit. In response, the marker server updates the patron's marker record in the marker database and instructs the ticket server to create a new voucher in the voucher database for that requested monetary value. The ticket server transmits the associated voucher ID number to the marker server, which forwards the voucher ID number to the casino app, which the patron can then redeem at a gaming machine for playing credit. Note that, depending on the implementation, the casino computer system maintains information about the association between the patron and the voucher, either by identifying the patron in the voucher record in the voucher database or by identifying the voucher ID number in the patron's marker record in the marker database or both.

Note that, in some implementations, the casino's gaming machines are unaware of any distinction between cashable value and non-cashable value and simply treat all vouchers the same way whether they are vouchers associated with cashable value or vouchers associated with non-cashable value.

Thus, the casino app enables a patron to establish lines of credit, draw markers having non-cashable value from an existing credit line having remaining credit to fund play at gaming machines and gaming tables, and cash out from those gaming machines and gaming tables. In doing so, the casino's ticket server creates and redeems vouchers, while the casino's marker server maintains patrons' marker records in the marker database in the same manner as described previously. Note that, in some embodiments, when a patron cashes out from a gaming machine, the gaming machine prints a paper voucher for the patron's remaining playing credits, while, in other embodiments, a virtual voucher is created when a patron cashes out from a gaming machine.

FIG. 1 shows a symbolic diagram representing a distributed network computer gaming system 600 for a casino that supports the use of a mobile device running a casino app to establish a new credit line, draw marker funds from an existing credit line to fund gaming at the casino, and cash out from that casino gaming. As used herein, the term "gaming voucher" refers generically to both conventional paper vouchers and virtual vouchers.

As shown in FIG. 1, the gaming system 600 has a ticket server 610 that maintains a voucher database 612, a transaction server 620 that maintains a reporting database 622 and a marker database 626, one or more instances of kiosk 630, and one or more (and typically many) instances of gaming machine 640, each having a Bluetooth low energy (BLE) peripheral device 642 and a unique tag 644. Note that, as far as the technology is concerned, the ticket server 610 and/or the transaction server 620 need not be physically located on the casino premises, although legal regulations often require at least the ticket server 610 to be physically located on the casino premises. Note that the functionality of the marker server described previously is provided by the transaction server 620 of the gaming system 600 of FIG. 1.

Also shown in FIG. 1 are the cell phone 650 of a casino patron and banking networks 624, all of which communicate with various components of the gaming system 600, but which are themselves not considered to be part of that system. The cell phone 650 runs the specially designed casino app that supports the functionality described in this specification associated with the gaming system 600. When the specification describes certain operations performed by the patron's cell phone 650, it should be understood that those operations are performed by the casino app running on that cell phone. Although the gaming system 600 is described in the context of the cell phone 650, those skilled in the art will understand that the gaming system 600 can operate with any suitable wireless device, such as (without limitation) a cell phone, a tablet, a laptop computer, a smart watch, a fitness tracker, a smart band, a smart medallion, or a smart key fob.

In certain implementations, the gaming system 600 is a retrofit gaming system based on a legacy gaming system that was originally designed to support paper vouchers having cashable value, but not paper vouchers having non-cashable value and not virtual vouchers at all, let alone virtual vouchers having non-cashable value, which legacy gaming system has been upgraded to support the functionality described below. In certain other implementations, the gaming system 600 is provisioned with original OEM (original equipment manufacturer) components that were originally designed and built to support the functionality of system 600 described herein.

The ticket server 610 may be based on any suitable legacy ticket server for casinos, including (without limitation) an EZ Pay ticket server from IGT of Reno, Nev.; an SDS, SDG, or ACSC ticket server from Bally Technologies Inc. of Enterprise, Nev.; a SYNKROS ticket server from Konami Gaming, Inc., of Las Vegas, Nev.; or an Oasis ticket server from Aristocrat Technologies, Inc., of Las Vegas, Nev. The ticket server 610 creates a gaming voucher by assigning a unique voucher ID to a specified monetary value and storing the voucher ID and the monetary value for the gaming voucher as related entries in a table of the voucher database 612. In the gaming system 600 of FIG. 1, there is no distinction made between paper vouchers and virtual vouchers; they are all just gaming vouchers. There are only gaming vouchers created and stored by the ticket server 610 in the same way as legacy paper vouchers.

The kiosk 630 may be based on any suitable kiosk designed for casinos, including (without limitation) an LSK series kiosk from Global Payments Gaming Services, Inc., of Las Vegas, Nev.; an Everi kiosk from Everi Holdings Inc. of Las Vegas, Nev.; an M3T kiosk from M3 Technology Solutions, LLC, of Norman, Okla.; or a suitable kiosk from any of NRT Technology Corp. of Canada; Glory Global Solutions Limited of Japan; Automated Systems America, Inc., of Glendale, Calif.; or Diebold Nixdorf, Inc., of North Canton, Ohio. Depending on the particular implementation, the kiosk 630 may be based on a legacy kiosk whose software has been upgraded to support the functionality of system 600 or the kiosk 630 may be a new OEM kiosk that was originally designed and built to support that functionality.

The gaming machine 640 may be based on any suitable gaming machine for casinos, including (without limitation) a suitable gaming machine from any of IGT of Reno, Nev.; Scientific Games Corporation of Las Vegas, Nev.; Aristocrat Technologies, Inc., of Las Vegas, Nev.; Konami Gaming, Inc., of Las Vegas, Nev.; Ainsworth Game Technology Inc. of Las Vegas, Nev.; or Everi Holdings Inc. of Las Vegas, Nev. Here, too, depending on the particular implementation, the gaming machine 640 may be based on a legacy gaming machine that has been upgraded to support the functionality of system 600 (as described further below) or the gaming machine 640 may be a new OEM gaming machine that was originally designed and built to support that functionality.

Depending on the implementation, the tag 644 has associated with it a unique tag ID. The tag 644 may be affixed to or mounted onto an outer surface of the gaming machine 640, e.g., on or near the input panel or mounted inside the gaming machine 640 itself, e.g., behind or near the input panel. The tag 644 may be (i) an optically readable tag that represents the tag ID using an optically readable code symbol, such as (without limitation) a one-dimensional barcode or a two-dimensional QR code, or (ii) a wirelessly readable tag, such as (without limitation) an RFID or NFC tag, that wirelessly transmits the tag ID, or any other suitable means for conveying the tag ID to the cell phone 650. Depending on the particular type of wireless tag used, the reading of the tag 644 by the cell phone 650 may involve two-way wireless communication (i.e., a query by the cell phone 650 followed by a response by the tag 644) or one-way wireless communication (i.e., the cell phone 650 detecting a beacon transmitted by the tag 644).

When the tag 644 is an optically readable tag, the cell phone 650 is able to optically read the code symbol to determine the tag ID. When the tag 644 is a wirelessly readable tag, the cell phone 650 is able to receive and process the RF signal transmitted by the tag 644 to determine the tag ID. In either case, the tag ID uniquely identifies and distinguishes the gaming machine 640 from all other gaming machines in the casino, each of which is analogous to the gaming machine 640 and has its own unique tag. Note that the tag 644 may be both an optically readable tag having a code symbol representing the tag ID and a wirelessly readable tag that transmits a wireless signal representing that same tag ID.

As indicated in FIG. 1, various other elements of the gaming system 600 are able to communicate with one another via suitable wireline and/or wireless links. In particular, the cell phone 650 and the kiosk 630 are each able to communicate with the transaction server 620 via the wireless communication network 602, which can be a conventional Bluetooth network or other suitable wireless network. In some implementations, the wireless network 602 is a private wireless network designed and configured to handle the expected volume of wireless communications within the gaming system 600. The transaction server 620 also capable of communicating with the one or more banking networks 624 via suitable wireline and/or wireless links. The ticket server 610 is able to communicate with both the kiosk 630 and the gaming machine 640 via suitable wireline or wireless communication links 604 and 606, respectively. The cell phone 650 is also able to communicate wirelessly via BLE communication link 608 with the gaming machine's BLE peripheral device 642, which, as described further below, is electrically connected to the gaming machine 640. Although the BLE peripheral device 642 is a wireless transceiver designed to communicate with the cell phone 650 via the Bluetooth low-energy link 608, in other implementations, other suitable wireless transmission protocols may be employed, such as (without limitation) NFC (near-field communication), Bluetooth, WiFi, ZigBee, or optical protocols.

The gaming system 600 enables a patron to use his cell phone 650 to establish a credit line at the casino, draw marker funds on the credit line to receive playing credit corresponding to a specified monetary value at the gaming machine 640 selected by the patron to enable the patron to play the gaming machine 640, and cash out from the gaming machine 640, all without having physically to insert into the gaming machine, money or other financial transaction means such as (without limitation) a paper voucher (i.e., TITO ticket), a player card, or a credit/debit bank card. Note that, as described below and unlike a conventional virtual or electronic wallet (aka e-wallet), at no time during this process, do the funds associated with the playing credit ever reside on the cell phone 650 itself or in an account associated with the patron. Moreover, in some implementations, at no time does the cell phone 650 or the patron have access to the voucher ID of any gaming voucher purchased by the patron or on behalf of the patron using the cell phone 650.

Prior to these operations, the patron registers with the transaction server 620, which creates a user profile for the patron in the reporting database 622. The user profile includes a unique user ID associated with the patron, a unique cell phone ID associated with the patron's cell phone 650, information regarding one or more funding sources (for example, without limitations, credit or debit card bank accounts, existing gaming vouchers stored in the voucher database 612, or an e-wallet) for the patron, and authentication information for the patron (for example, without limitation, a PIN (personal identification number), finger print, thumb print, voice print, face print, retina print, transaction DNA, block chain, token, and/or certificate associated with the patron).

The transaction server 620 also maintains in the reporting database 622, for each registered patron, a transaction ledger that documents the transactions performed by the patron using the cell phone 650, where, for each transaction, the transaction ledger includes the voucher ID of the gaming voucher created for the transaction, the monetary value of the transaction, the type of the transaction (e.g., crediting a gaming machine vs. other types of transactions), a date-and-time stamp for the transaction, and a location associated with the transaction (e.g., the tag ID of the gaming machine's tag 644). With at least one viable funding source registered with the transaction server 620, the patron is able to use his cell phone 650 to establish a credit line and draw marker funds from the credit line to have playing credit transferred to the gaming machine 640 for use by the patron to play the gaming machine's game, according to the processing described below. When the patron's user profile identifies multiple funding sources, the patron can use the cell phone 650 to select a default funding source and be queried by the transaction server 620 to select a different funding source if the default funding source is deficient.

FIG. 2 is a table representing the status of a patron's marker record in the marker database 626 for example gaming scenarios involving the gaming system 600 of FIG. 1. FIG. 2 identifies the following values associated with a patron who has a credit line with the casino: the monetary value of the patron's credit line, the remaining credit on the patron's credit line, the total monetary value of the patron's active markers, the patron's available funds, the patron's playing credits at a gaming machine or gaming table, the patron's cashable value, and the patron's non-cashable value. As described previously, the marker record need not explicitly store each of these values in order for the transaction server 620 of FIG. 1 to track all of these values. Furthermore, although not represented in FIG. 2, the transaction server 620 may keep track of each active marker separately with one or more different marker timers associated with active markers.

Row 1 of FIG. 2 represents the status of a patron's marker record after the establishment of a $100 credit line for the patron. At this time, the patron has $100 of remaining credit on his $100 credit line.

Row 2 represents the status of the patron's marker record after the patron draws a $40 marker against his $100 credit line. At this time, the patron has $60 of remaining credit on his $100 credit line, $40 of active markers, and $40 of available funds, where all $40 of those available funds all have non-cashable value.

Row 3 represents the status of the patron's marker record after the patron transfers all $40 of his available funds to play at a gaming machine (e.g., the gaming machine 640 of FIG. 1). At this time, the patron has $0 of available funds and $40 of playing credits, all of which have non-cashable value.

Row 4 represents the status of the patron's marker record after the patron gambles and loses all $40 of his playing credits at the gaming machine. At this time, the patron has $0 of playing credits.

Row 5 represents the status of the patron's marker record after the patron draws a second marker of $50 from his credit line. At this time, the patron has $10 of remaining credit, two active markers totaling $90, and $50 of available funds, all of which have non-cashable value.

Row 6 represents the status of the patron's marker record after the patron transfers all $50 of his available funds to play at a gaming machine (e.g., either the same gaming machine as before or a different gaming machine). At this time, the patron has $0 of available funds and $50 of playing credits, all of which have non-cashable value.

Row 7 represents the status of the patron's marker record after the patron gambles and cashes out $130 of playing credit from the gaming machine. At this time, the patron has $130 of available funds and $0 of playing credit. Since the patron has $90 of active markers, $90 of those $130 of available funds have non-cashable value, while the remaining $40 of those available funds have cashable value representing the net winnings of the patron.

Row 8 represents the status of the patron's marker record after the patron redeems his $130 of available funds. Since $90 of those available funds had non-cashable value, those $90 are used to pay off the $90 of active markers. The remaining $40 of available funds had cashable value that were credited to the patron's bank or credit card account. At this time, the patron has $100 of remaining credit on his $100 credit line, no active markers, and $0 of available funds.

Referring back to Row 3, since the $0 of available funds is less than the $40 of active markers, the marker timer for the $40 marker of Row 2 will begin to run at the time of Row 3. Similarly, since the $50 of available funds at the time of Row 5 is less than the $90 of active markers, the marker timer for the $50 marker of Row 5 will begin to run at the time of Row 5. In a scenario different from the scenario of Rows 6-8, assume that, after establishing the status of Row 5, the patron does no further gaming. In that case, the marker timer for the $40 marker of Row 2 and the marker timer for the $50 marker of Row 5 will both continue to run.

Eventually, the marker timer for the patron's $40 marker of Row 2 will expire, and the transaction server 620 will automatically take actions to pay off that marker. In this case, the transaction server 620 will apply $40 of the patron's $50 of available funds to pay off the $40 marker of Row 2. Row 9 represents the resulting status of the patron's marker record, where the patron has $50 of remaining credit, $50 of active markers (corresponding to the second marker of Row 5), and $10 of available funds, all of which have non-cashable value.

Eventually, the marker timer for the patron's $50 marker of Row 5 will expire, and the transaction server 620 will automatically take actions to pay off that marker. In this case, the transaction server 620 will apply the patron's $10 of available funds to partially pay off the $50 marker of Row 5. Row 10 represents the status of the patron's marker record immediately after the transaction server 620 partially pays off the $50 marker. At that time, the patron has $60 of remaining credit, $40 of active markers (corresponding to the unpaid balance of the $50 second marker of Row 5), and $0 of available funds.

Since the patron still owes $40 on the $50 marker of Row 5 and since the marker timer for the marker has expired, the transaction server 620 will continue to take actions to pay off that marker completely. For example, the transaction server 620 may access one of the banking networks 624 of FIG. 1 to process a charge to the patron's credit card or a debit from the patron's bank account for the remaining $40 on the $50 marker. Row 11 represents the resulting status of the patron's marker record, where the patron has $100 of remaining credit on his $100 credit line, no active markers, and $0 of available funds.

The following are the steps involved in a patron establishing and subsequently tapping a credit line to receive playing credit at the gaming machine 640 of the gaming system 600 of FIG. 1, according to one possible implementation.

At step A1, the patron uses the casino app on his cell phone 650 to request the establishment of a new credit line. In particular, the cell phone 650 transmits a new credit line request via the wireless network 602 to the transaction server 620 to begin the process of establishing a new credit line for the patron. The new credit line request includes the cell phone ID, the desired monetary value of the credit line, and authentication information for the patron.

At step A2, the transaction server 620 accesses the patron's user profile in the reporting database 622 using the received cell phone ID and determines whether to authorize the patron's new credit line request by (i) comparing the received authentication information with the patron's authentication information stored in the patron's user profile and (ii) determining whether the requested monetary value is acceptable (e.g., within specified limits previously established by and/or for the patron).

Assuming that the new credit line request is authorized, at step A3, the transaction server 620 creates a new marker record for the patron in the marker database 626 for the new credit line (or updates the patron's existing marker record, if one already exists).

At step A4, the transaction server 620 transmits a message back to the cell phone 650 via the wireless network 602 confirming that the credit line has been established.

At step A5, the patron uses the casino app on his cell phone 650 to transmit a marker draw request via the wireless network 602 to the transaction server 620 to begin the process of having playing credit transferred to a to-be-specified gaming machine on behalf of the patron. The marker draw request includes the cell phone ID, the desired monetary value of the requested marker draw, and authentication information for the patron.

At step A6, the transaction server 620 accesses the patron's user profile in the reporting database 622 and the patron's marker record in the marker database 626 using the received cell phone ID and determines whether to authorize the patron's marker draw request by (i) comparing the received authentication information with the patron's authentication information stored in the patron's user profile in the reporting database 622 and (ii) determining whether the requested monetary value is acceptable based on the remaining credit available to the patron as recorded in patron's marker record in the marker database 626.

Assuming that the marker draw request is authorized, at step A7, the transaction server 620 creates a new transaction record in the patron's transaction ledger in the reporting database 622 for the new transaction and records the monetary value in the new transaction record. The transaction server 620 assigns a unique transaction ID that contains the patron's user ID and stores that transaction ID in the transaction record. Assigning a unique transaction ID associated with each transaction associated with the cell phone's unique ID enables the transactions to be uniquely batched and tracked using duplicate ledgers, where batch handling and backups can be continuously updated and appended without duplication. The transaction server 622 also updates the patron's marker record in the marker database 626 as described further below.

At step A8, the transaction server 620 transmits a kiosk voucher request via the wireless network 602 to the kiosk 630, where the kiosk voucher request includes the transaction ID and the monetary value.

At step A9, the kiosk 630 receives the kiosk voucher request and transmits a ticket-server voucher request via the communication link 604 to the ticket server 610, where the ticket-server voucher request includes (at least) the monetary value and a local date-and-time stamp. Those skilled in the art will understand that some ticket servers may require additional information, such as (without limitation) a unique kiosk ID associated with the kiosk 630. The kiosk 630 maintains a voucher-request ledger that maps the kiosk voucher request received from the transaction server 620 to the ticket-server voucher request that the kiosk 630 sent to the ticket server 610.

At step A10, upon receiving the ticket-server voucher request from the kiosk 630, the ticket server 610 creates a new gaming voucher having the monetary value specified in the ticket-server voucher request, by (i) assigning a unique voucher ID, (ii) storing the voucher ID, the monetary value, the date-and-time stamp, and (if appropriate) the kiosk ID in the voucher database 612, and (iii) transmitting the voucher ID and the received date-and-time stamp via the communication link 604 to the kiosk 630.

At step A11, the kiosk 630 uses the received date-and-time stamp to retrieve the corresponding transaction ID from its local memory and transmits the voucher ID and the transaction ID via the wireless network 602 to the transaction server 620.

At step value A12, the kiosk 630 starts a voucher-redemption timer having a specified duration (e.g., 3 seconds) for the new gaming voucher. If the voucher-redemption timer expires before the new gaming voucher is redeemed, then the kiosk 630 takes steps to cancel the transaction. These steps are described below with respect to steps A35-A39.

At step A13, the transaction server 620 uses the transaction ID received from the kiosk 630 in step A11 to identify the corresponding transaction record in the patron's transaction ledger in the reporting database 622 and adds the received voucher ID to that transaction record.

At step A14, the transaction server 620 transmits to the cell phone 650 via the wireless network 602, a message indicating that a new gaming voucher has been successfully created for the requested transaction and that the patron needs to identify the gaming machine 640 that the patron wants to play.

At step A15, as instructed by the cell phone 650, the patron uses the cell phone 650 to read the tag ID associated with the tag 644 mounted on the gaming machine to be credited.

In a casino with many instances of the gaming machine 640, each having an instance of the BLE peripheral device 642, the cell phone 650 will simultaneously receive multiple BLE signals from nearby gaming machines 640. In order to read the tag 644 of the desired gaming machine 640, the patron places the cell phone 650 near that tag 644, thereby improving the probability that the BLE signal from the BLE peripheral device 642 of that gaming machine 640 will have a received signal strength at the cell phone 650 that is greater than the individual received signal strengths of the BLE signals from the BLE peripheral devices 642 of all of the other gaming machines 640 in the casino. When the cell phone 650 reads the tag 644, at step A16, the cell phone 650 selects the BLE signal with the strongest signal level and stores the peripheral device ID (e.g., the serial number of the BLE peripheral device 642) contained in that signal.

At step A17, the cell phone 650 transmits the tag ID, the transaction ID, and the phone ID to the transaction server 620 via the wireless network 602.

At step A18, the transaction server 620 adds the tag ID to the transaction record in the patron's transaction ledger in the reporting database 622. The transaction server 620 identifies the transaction ledger for the patron using the transaction ID and the phone ID received from the cell phone 650.

The transaction server 620 maintains a tag ID table registered by the casino, that maps tag IDs to peripheral device IDs and the type of transaction (e.g., funding a gaming machine vs. a different type of transaction). At step A19, the transaction server 620 uses the tag ID received from the cell phone 650 to access the tag ID table to determine if the type of transaction is funding a gaming machine. If so, then, at step A20, the transaction server 620 retrieves from the tag ID table, the peripheral device ID associated with the received tag ID. Note that the tag ID table also stores, for each tag, a business ID identifying the casino and an encryption key for the peripheral device 642 (if encryption is supported, as described below for step A21).

At step A21, the transaction server 620 generates a transaction package for the transaction. As used herein, the term "transaction package" is a formatted message that represents (at least) the voucher ID of the gaming voucher for the transaction. In one possible implementation, the transaction package contains the unencrypted voucher ID. In another possible implementation, the transaction package contains an encrypted value representing the voucher ID. In yet another possible implementation, the transaction package contains the unencrypted voucher ID and the unencrypted monetary value associated with that voucher ID. In a preferred implementation of FIG. 1, the transaction package is a tokenized transaction package (TTP) message that contains an encrypted value representing (at least) both the voucher ID and its monetary value. Those skilled in the art will understand how to select and apply a suitable encoding technique to generate encrypted values. Those skilled in the art will also understand that other implementations employ other suitable techniques for generating encrypted or unencrypted transaction packages. As used herein, the term "tokenized" implies that one or more sensitive data elements are represented in the TTP message by non-sensitive equivalents, referred to as tokens, that have no extrinsic or exploitable meaning or value. A token is a reference (i.e., identifier) that maps back to the sensitive data through a tokenization system. The mapping from original data to a token uses a method that renders tokens infeasible to reverse in the absence of the tokenization system. In the preferred implementation of FIG. 1, tokenization is achieved using a suitable encryption technique that replaces sensitive data elements, such as the voucher ID and its corresponding monetary value, with corresponding encrypted values.

At step A22, the transaction server 620 transmits the TTP message along with the retrieved peripheral device ID to the cell phone 650 via the wireless network 602.

At step A23, the cell phone 650 compares the peripheral device ID received from the transaction server 620 to the stored peripheral device ID associated with the previously selected, strongest received BLE signal.

If there is not a match, then, at step A24, the cell phone 650 instructs the patron to move the cell phone 650 closer to the tag 644 then re-selects the BLE signal having the strongest received signal strength. Processing then returns to step A23. Moving the cell phone 650 closer to the tag 644 improves the probability that the strongest received BLE signal will be from the BLE peripheral device 642 of the selected gaming machine 640. The processing of steps A23 and A24 continues until the peripheral device IDs compared in step A23 match. If the IDs do not match quickly enough, then the voucher-redemption timer in the kiosk 630 will time out, the kiosk 630 will redeem the voucher (as described previously), and the cell phone 650 will instruct the patron to try again.

If and when there is a match, at step A25, the cell phone 650 establishes a Bluetooth connection with the BLE peripheral device 642 of the selected gaming machine 640 and transmits the TTP message to the BLE peripheral device 642. Note that the cell phone 650 does not decrypt the TTP message. As such, neither the cell phone 650 nor the patron has access to the voucher ID.

At step A26, the BLE peripheral device 642 decrypts the received TTP message to recover the monetary value and the voucher ID.

At step A27, the BLE peripheral device 642 transmits the voucher ID and the monetary value to the gaming machine 640, which adds the monetary value to its running total of all of the recent purchases of its playing credit.

Note that, in an alternative implementation, the bill validator of the gaming machine 640, and not the BLE peripheral device 642, decrypts the received TTP message to recover the monetary value and the voucher ID. In that case, steps A26 and A27 will instead involve the BLE peripheral device 642 transmitting the TTP message to the gaming machine's bill validator, which then decrypts the TTP message.

At step A28, the gaming machine 640 transmits the voucher ID to the ticket server 610 via the communication link 606.

At step A29, the ticket server 610 accesses the voucher database 612 to retrieve the monetary value associated with the received voucher ID and transmits the retrieved monetary value to the gaming machine 640.

At step A30, the gaming machine 640 increases its playing credit by the received monetary value, thereby enabling the patron to play or continue to play the gaming machine 640.

In one implementation, a transaction-funding business that operates the transaction server 620 is a check under-writing service that keeps track of all of the different operations and gets paid off-line, as needed, by the casino and/or the different patrons. If the patron's funding source for the transaction was a credit/debit bank card, then, at step A31, the transaction server 620 communicates with the appropriate banking network 624 to reimburse the transaction-funding business that operates the transaction server 620 for paying for the playing credit using conventional bank-to-bank ACH (automated clearing house) processing. If the patron's funding source was a different, previously created, but never redeemed gaming voucher, then, at step A32, the transaction server 620 instructs a kiosk, such as the kiosk 630, to redeem that voucher with the ticket server 610 at step A33. Note that fees may be charged by different entities to support the operations of the gaming system 600. For example, the transaction server 620 may charge a fee to the patron and/or the casino for each transaction.

When the voucher-redemption timer that was set in step A12 expires, at step A34, the kiosk 630 queries the ticket server 610 about the existence of the gaming voucher, and the ticket server 610 responds by confirming whether or not the gaming voucher still exists. Under normal circumstances, using processing described above, the gaming voucher will be redeemed by the gaming machine 640 well before the voucher-redemption timer times out, in which case, the ticket server 610 will respond to the kiosk 630 by indicating that the gaming voucher is no longer valid. In that case, the kiosk 630 assumes that the gaming machine 640 properly redeemed the gaming voucher and so the kiosk 630 takes no further corrective actions.

If, however, the ticket server 610 indicates to the kiosk 630 that the gaming voucher is still valid, then the kiosk 630 determines that something has gone wrong and takes action to un-do the transaction. In particular, at step A35, the kiosk 630 transmits a request to the ticket server 610 to redeem the gaming voucher, and the ticket server 610 erases or otherwise cancels the gaming voucher in the voucher database 612 and transmits the corresponding monetary value to the kiosk 630. At step A36, the kiosk 630 then instructs the transaction server 620 to cancel or reverse the transaction. At step A37, the transaction server 620 (i) transmits a message via the wireless network 602 to the cell phone 650 indicating that the cell phone's playing-credit purchase request has failed and (ii) updates the patron's transaction ledger accordingly. At step A38, the cell phone 650 informs the patron that the request for playing credit has failed and (optionally) asks the patron to try again. If necessary, at step A39, the transaction server 620 also sends a message to the appropriate banking network 624 to reverse the transaction.

The following represents the steps involved in a patron cashing out from the gaming machine 640 of the gaming system 600 of FIG. 1, according to certain embodiments. Assuming that the patron has some remaining playing credit at the gaming machine 640, the patron engages the "cash out" button of the gaming machine 640. The gaming machine 640 communicates (i) with the ticket server 610 to have a gaming voucher generated for the remaining playing credit and (ii) with the transaction server 620 to have the patron's marker record updated in the marker database 626. In some implementations, the gaming voucher is a paper voucher printed by the gaming machine 640. In other implementations, the gaming voucher is a virtual voucher.

Depending on the implementation, the patron can redeem a paper voucher at a gaming machine or gaming table for playing credits or at a kiosk or casino cage, in which case the transaction server 626 will determine how much of the voucher value is cashable and how much is non-cashable and update the patron's marker record accordingly. Similarly, the patron can use the casino app on his cell phone to redeem a virtual voucher at a gaming machine or gaming table for playing credits, in which case, the transaction server 626 will update the patron's marker record accordingly. Alternatively, the patron can used the casino app to redeem a virtual voucher "for value," in which case, the transaction server 626 will update the patron's marker record according to how much of the voucher's value is cashable vs. non-cashable. In all of these cases, the casino's computer system needs to be able to identify the owner of the gaming voucher in order to determine which marker record to update.

The following represents the steps involved in a patron redeeming a gaming voucher in the gaming system 600 of FIG. 1, according to one possible implementation.

At step B1, the patron uses the casino app on his cell phone 650 to transmit a voucher redemption request via the wireless network 602 to the transaction server 620. The voucher redemption request identifies the cell phone ID and the voucher value to be redeemed. Note that, in one implementation, the casino app keeps track of the different amounts of voucher value associated with the patron, where the casino app limits the patron to redeem only one voucher at a time. Other implementations might not be limited in this manner.

At step B2, the transaction server 620 accesses the patron's marker record in the marker database 626 to identify a voucher ID number associated with the requested voucher value to be redeemed.

At step B3, the transaction server 620 transmits, via the wireless network 602 to the kiosk 620, a voucher redemption request identifying the voucher ID number.

At step B4, the kiosk 620 forwards the voucher redemption request via the communication link 604 to the ticket server 610.

At step B5, the ticket server 610 accesses the corresponding voucher record in the voucher database 612 to retrieve the monetary value of the voucher and update the voucher record as described previously.

At step B6, the ticket server 610 transmits the retrieved monetary value of the redeemed voucher via the communication link 604 to the kiosk 630.

At step B7, the kiosk 630 transmits the monetary value of the redeemed voucher via the wireless network 602 to the transaction server 620.

At step B8, the transaction server 620 updates the patron's marker record based on the monetary value of the redeemed voucher as described previously.

In one retrofit implementation, a legacy gaming system is upgraded to provide the gaming system 600 of FIG. 1, where the legacy casino system already had one or more legacy kiosks, one or more legacy gaming machines, a legacy ticket server, and a legacy voucher database, where the upgrading involves:

Modifying the software of each legacy kiosk to provide each instance of the kiosk 630 of FIG. 1;

Modifying each legacy gaming machine to provide each instance of the gaming machine 640 of FIG. 1 by (i) affixing an instance of the tag 644 to the legacy gaming machine and (ii) electrically connecting an instance of the BLE peripheral device 642 to the legacy gaming machine as described further below; and Adding the transaction server 620, the reporting database 622, and the marker database 626 to the legacy gaming system.

Note that the hardware of the kiosk 630 does not need to be modified. Furthermore, neither the software nor the hardware of the legacy ticket server and the legacy voucher database need to be modified at all, such that the ticket server 610 is the legacy ticket server and the voucher database 612 is the legacy voucher database.

Figure 3:
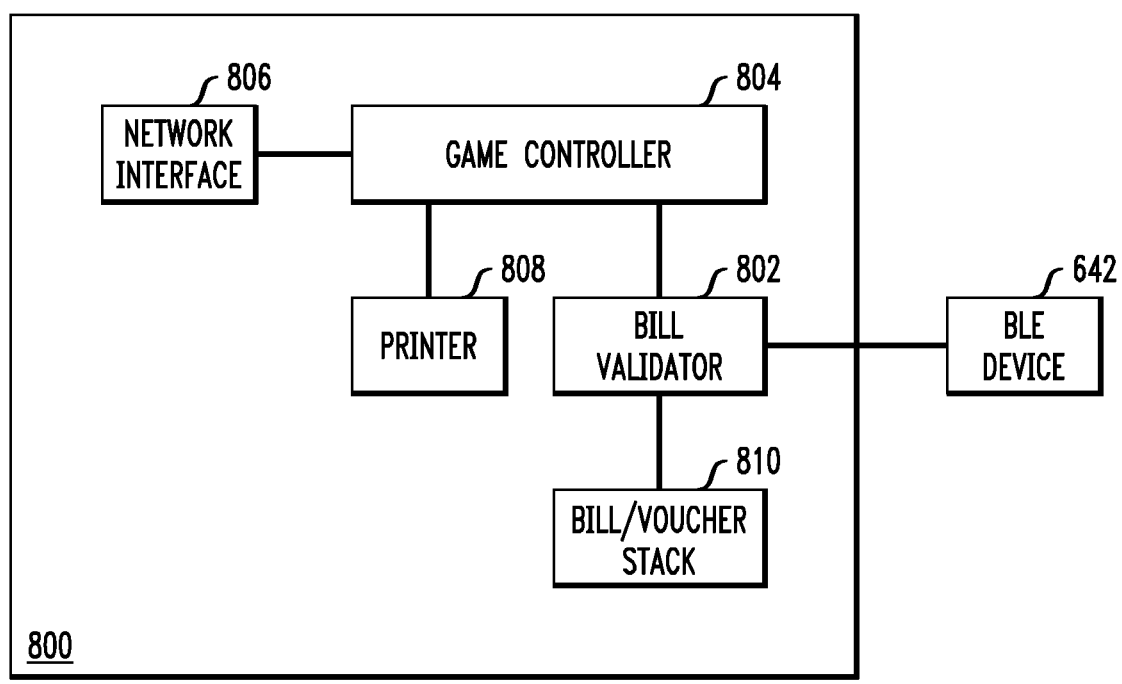
FIG. 3 is a simplified block diagram of the gaming machine of FIG. 1.

FIG. 3 is a simplified block diagram of the gaming machine 640 of FIG. 1. In FIG. 3, block 800 corresponds to a legacy gaming machine that was modified to provide the gaming machine 640. In one implementation, the legacy gaming machine was modified by updating the legacy bill validator and adding the BLE peripheral device 642. The updating of the legacy bill validator may involve (i) modifying the software of the legacy bill validator to provide the bill validator 802 of FIG. 3 or (ii) replacing the legacy bill validator with the bill validator 802. As represented in FIG. 3, the BLE peripheral device 642 is electrically connected to the bill validator 802. In one possible implementation, the BLE peripheral device 642 is electrically connected to the transmit wire, the receive wire, and the reference ground wire of a TTL (transistor-transistor logic) serial bus that also interconnects the game controller 804 and the bill validator 802. Note that, in some implementations, neither the hardware nor the software of any of the game controller 804, the network interface 806, and the printer 808 of the legacy gaming machine needs to be modified. In an embodiment in which the legacy gaming machine already had a so-called smart bill/voucher stack that can track a running total of all of the recent purchases of playing credit at the gaming machine, neither the hardware nor the software of the legacy bill/voucher stack needs to be modified to provide the bill/voucher stack 810 of FIG. 3. Otherwise, the legacy bill/voucher stack will need to be upgraded by either modification or replacement.

As understood by those skilled in that art, the game controller 804 controls the operations of the game that is played on the gaming machine 640, the network interface 806 enables the gaming machine 640 to communicate with the ticket server 610 of FIG. 1 and possibly other nodes in the gaming system 600, the printer 808 enables the gaming machine 640 to print paper vouchers based on remaining playing credit, and the bill validator 802 enables the gaming machine 640 to receive cash and paper vouchers to add playing credit.

As described previously with reference to step 23, the BLE peripheral device 642 transmits the voucher ID and the monetary value to the gaming machine 640. In particular, the BLE peripheral device 642 transmits the voucher ID and the monetary value to the bill validator 802, which (i) forwards the voucher ID to the game controller 804 in a way that is identical to how a legacy bill validator would forward a voucher ID associated with a received paper voucher to a legacy game controller and (ii) forwards the monetary value to the bill/voucher stack 810 in a way that is identical to how a legacy bill validator would forward a monetary value for a received paper voucher to a legacy, smart bill/voucher stack. The game controller 804 forwards the voucher ID to the network interface 806, and the network interface 806 transmits the voucher ID to the ticket server 610 of FIG. 1, again in ways that are identical to how legacy game controllers and legacy network interfaces operate for voucher IDs of paper vouchers. Similarly, the network interface 806 receives a monetary value from the ticket server 610 and forwards that monetary value to the game controller 804, which increases its playing credit by the monetary value, all in ways that are identical to how legacy network interfaces and legacy game controllers operate for monetary values of paper vouchers.

Note that the kiosk 630 and the gaming machine 640 still support all of the legacy functionality associated with paper vouchers, including paper-based cash-in and cash-out operations.

Although the operations of the gaming system 600 have been described in the context of the gaming machine 640 of FIGS. 1 and 3, which has a bill validator 802, a bill/voucher stack 810, and a printer 808, in alternative implementations, a gaming system could have one or more completely paperless gaming machines that do not have any of those three components in addition to or instead of instances of the gaming machine 640. Instead, each paperless gaming machine would have a wireless transceiver that can communicate directly with the cell phone 650 and with the game controller 804.

Although the operations of the gaming system 600 have been described in the context of funding playing credit at gaming machines such as (without limitation) slot machines and electronic poker machines, in certain implementations, the gaming system 600 can also support funding playing credit at gaming tables such as (without limitation) blackjack tables and roulette tables. In those implementations, the transaction server 620 is able to instruct a voucher printer (not shown in FIG. 1) located at or near a gaming table to print a paper voucher for the transaction based on the gaming voucher created by the ticket server 610. The gaming table would have a tag analogous to the gaming machine's tag 644 that the patron would read with his/her cell phone 650 to identify the gaming table to the transaction server 620. The dealer at the gaming table would redeem the paper voucher using a conventional legacy operation involving a voucher reader that communicates with the voucher server and provide corresponding conventional playing chips to the patron. The voucher printer may be any suitable voucher printer for casinos, including (without limitation) a suitable voucher printer from JCM American Corporation of Las Vegas, Nev.; TransAct Technologies Incorporated of Hamden, Conn.; FutureLogic, Inc., of Glendale, Calif.; or Nanoptics, Inc., of Gainesville, Fla. Note that, if the gaming table has a (wireline or wireless) smart can that can communicate directly with the transaction server, then the voucher printer and the paper voucher can potentially be omitted from this implementation while still supporting the funding of playing credit at the gaming table using the patron's cell phone 650.

BLE Peripheral Device Slot Interface

This section provides implementation details for the slot interface of a BLE peripheral device 642 according to one possible implementation of the gaming system 600 of FIGS. 1 and 3. The peripheral device slot interface provides a mechanism whereby a Bluetooth-enabled cell phone 650 transmits a tokenized transaction package (TTP) message to a selected gaming machine 640, which unbundles/decrypts the TTP message and forwards the recovered voucher ID to the gaming machine's game controller 804, which follows a legacy process for redeeming gaming vouchers and driving playing credits to the gaming machine 640. The BLE peripheral device 642 and the cell phone 650 use a suitable Bluetooth low-energy communication protocol as their wireless network technology. Data is sent and received using standard GATT (Generic Attribute Profile) services and characteristics.

As described previously, the gaming system 600 enables a casino patron to draw funds against an existing marker to purchase a gaming voucher having non-cashable value using the cell phone 650 and have the corresponding playing credit applied securely to a selected gaming machine 640 without the use of a paper ticket or currency. The patron interacts with the gaming machine's BLE peripheral device 642 and the transaction server 620 using a custom application installed on the patron's BLE-enabled cell phone 650.

The BLE peripheral device 642 is connected to the gaming machine's bill validator 802 within the locked cabinet of the gaming machine 640 such that radio signals can propagate through the cabinet to and from the BLE peripheral device 642. The BLE peripheral device 642 is near other instances of the BLE peripheral device 642, which broadcast the same advertised GATT Service. The proximity of nearby BLE peripheral devices is dependent on the layout of the casino floor and the positioning of the BLE peripheral device 642 within each gaming machine cabinet.

Each instance of the BLE peripheral device 642 is registered with the transaction server 620, which stores the following information in the reporting database 622 for each instance: a business ID identifying the casino, the serial number of the BLE peripheral device 642, and an encryption key for the BLE peripheral device 642 (if encryption is supported).

The patron has registered the cell phone 650 with the transaction server 620, and the cell phone 650 is capable of receiving a valid TTP message (containing the purchased voucher ID and the associated monetary value) from the transaction server 620. As described previously, the transaction server 620 has access to the kiosk 630, which in turn has access to the ticket server 610. The location of the casino is identified via a combination of assisted GPS plus the use of BLE beacons that are placed in the areas of the casino containing instances of the gaming machine 640, each of which is equipped with a BLE peripheral device 642 connected to its bill validator 802.

When the patron uses the cell phone 650 to read the tag 644 of a particular gaming machine 640, the cell phone 650 will be physically very near the BLE peripheral device 642 of that gaming machine 640. The typical distance between the cell phone 650 and the front of the gaming machine 640 is about 6 to 8 inches, with some transactions performed with the cell phone 650 almost directly on the front of the gaming machine 640 and other transactions with the cell phone 650 as far away as 12 inches. It is not expected that any transaction will be performed with the cell phone 650 more than 24 inches from the face of the selected gaming machine 640.

Unless the BLE peripheral device 642 has been connected to a cell phone 650 and is processing a TTP message, the BLE peripheral device 642 is repeatedly advertising its service by broadcasting its unique peripheral device ID, its transmit (TX) power level, the shared 128-bit Universal Unique Identifier (UUID) for the transaction service (i.e., purchasing playing credit), and service data. The cell phone 650 measures the power level of the received (RX) signal and compares that measured RX power level to the received TX power level to estimate the distance from the cell phone 650 to the BLE peripheral device 642. The service data includes (at least) the manufacturer code and version number for the BLE peripheral device 642.

One exception is if the cell phone 650 connects and sends invalid data to the BLE peripheral device 642 three times consecutively; at which point, the BLE peripheral device 642 shuts down for one hour, driving a legacy suspected fraud response from the gaming machine 640. If the cell phone 650 connects but no data is received within 5 seconds, then the BLE peripheral device 642 disconnects and resumes advertising. The BLE peripheral device 642 connects to only a single cell phone 650 at a time; during which, the BLE peripheral device 642 stops advertising.

The following procedure is performed each time the patron requests funds for the purpose of transferring playing credit to a gaming machine 640. Using the casino application on the cell phone 650, the patron selects an option to transmit to the transaction server 620 a request for a TTP message that will be used to drive playing credit to a selected gaming machine 640. The transaction server 620 interfaces with the kiosk 630, which in turn interfaces with the ticket server 610 to purchase a gaming voucher with a corresponding monetary value. The transaction server 620 bundles the authorized gaming voucher and associated information into a TTP message that is transmitted to the cell phone 650. TTP messages are short-lived and, if not redeemed by the selected gaming machine 640 within a specified time limit, will be auto-redeemed (reversed) back into the patron's account by the kiosk 630.

The patron uses the cell phone 650 to read the tag ID of the tag 644 on the selected gaming machine 640. The cell phone 650 transmits the tag ID to the transaction server 620, which uses the tag ID to access the reporting database 622 to retrieve and transmit back to the cell phone 650, the peripheral device ID associated with that same gaming machine 640. The cell phone 640 immediately begins to scan for nearby BLE peripheral devices 642. When the cell phone 650 determines that a nearby BLE peripheral device 642 is broadcasting the correct service UUID and a peripheral device ID that matches the peripheral device ID received from the transaction server 620, the cell phone 650 transmits a connection request to establish a connection with that BLE peripheral device 642.

If an encryption key exists for the BLE peripheral device 642, then the cell phone 650 exchanges random cryptographic data with the BLE peripheral device 642 to enable the cell phone 650 and the BLE peripheral device 642 to generate respective copies of an Initialization Vector (IV) that are exchanged between the two devices to secure a connection. If an encryption key is associated with the BLE peripheral device 642, then the TTP message will be encrypted using that encryption key; otherwise, the TTP message is non-encrypted.

The cell phone 650 transmits the TTP message to the BLE peripheral device 642 by writing the TTP message to a first specified characteristic "with response." The BLE peripheral device 642 unbundles/decrypts the received TTP message to recover the voucher ID and the associated monetary value and transmits the monetary value back to the cell phone 650. Provided that the write of the TTP message is successful and the monetary value received from the BLE peripheral device 642 matches the monetary value originally requested by the cell phone 650, the cell phone 650 waits to be notified of an available response code on a second specified characteristic. The cell phone 650 continues to wait to be notified of a change in value of this response code until its length is non-zero, or until 10 seconds have elapsed. Example response codes are identified in the following table. If the BLE peripheral device 642 is not capable of sending any feedback data to the cell phone 650, then the BLE peripheral device 642 returns "00" as the default setting for the characteristic.

| RESPONSE CODES | | |
|---|---|---|
| Code | Name | Description |
| 00 | Success | The voucher has the correct format, has been presented to the gaming machine for redemption, and, in some implementations, has been successfully redeemed. |
| 01 | Immediate Duplicate | The voucher is a duplicate of the immediately previous voucher, which was successfully presented and redeemed. |
| 02 | Prior Duplicate | The voucher is a duplicate of a previously redeemed voucher, but not the immediately presented and redeemed voucher. |
| 03 | Format Error | The voucher has an invalid format. |
| 04 | Not-Found Error | The voucher does not exist in the voucher database. |
| 05 | System Error | A system error was detected, and the voucher could not be presented to the gaming machine. |
| 06 | Decryption Error | A decryption error was detected when decrypting TTP message the voucher, and the voucher could not be presented to the gaming machine. |
| 99 | Other Error | An unexpected or unclassified error was encountered, and the voucher could not be presented to the gaming machine. |

After the response code is read, the cell phone 640 will issue a disconnect request to the BLE peripheral device 642, at which time, the BLE peripheral device 642 immediately begins advertising for another connection request. In some implementations, if the response code returned from the BLE peripheral device 642 is "00," then the cell phone 650 verifies that the gaming voucher has actually been redeemed by the gaming machine 640 by the cell phone 650 querying the ticket server 610 via the interface to the kiosk 630.

In one possible implementation, the casino's computer system requires the patron to pay off the redeemed portion of the marker before allowing the patron to redeem any cashable value.

In certain embodiments, a server for a casino computer system tracks, for a casino patron, a non-cashable value for the patron and a cashable value for the patron, wherein the server prevents the patron from cashing out any of the patron's non-cashable value for freely negotiable monetary value.

In certain embodiments, the server enables the patron to cash out the patron's cashable value up to the amount by which the patron's cashable value exceeds the patron's non-cashable value.

In certain embodiments, the server enables the patron to cash out up to all of the patron's cashable value independent of the existence of a non-zero non-cashable value for the patron.

In certain embodiments, if the patron has a non-zero non-cashable value, then the server requires the patron to bet with the patron's non-cashable value before betting with any of the patron's cashable value.

In certain embodiments, if the patron requests funds for gaming at a gaming machine or a gaming table and the server transmits funds associated with the patron's non-cashable value, then the gaming machine or gaming table is unaware of the difference between non-cashable value and cashable value.

Although FIG. 1 shows the marker database 626 being maintained by the transaction server 620, which is different from the ticket server 610, in alternative embodiments, the marker database 626 is maintained by the ticket server 610. In still other embodiments, the ticket server 610 and the transaction server 620 are implemented in a single node of the distributed network computer gaming system.

Gaming Tables

FIG. 1 illustrates the use of non-cashable markers to fund gaming at gaming machines, such as the gaming machine 640. Those skilled in the art will understand that non-cashable markers can also be used to fund play at gaming tables for such games as (without limitation) blackjack, poker, roulette, craps, and baccarat. As with gaming machines, a non-cashable marker can be used to purchase a (paper or virtual) gaming voucher used to fund playing credit at a table game. In certain embodiments, a patron draws a marker to acquire a gaming voucher having non-cashable value. The patron then redeems the gaming voucher at a gaming table and is provided playing chips of an equivalent value for use in playing at the gaming table.

In some embodiments, when the patron still has playing chips when the patron is finished playing at the gaming table, the patron is given the option of deciding how much of the chips' value to apply to pay down or possibly pay off any outstanding markers. The patron gives a pit clerk working at a nearby pit station some or all of his chips. The pit clerk then uses the value of those chips and the identity of the patron to communicate with the marker server to update the patron's marker record. If there is any remaining chip value, then that remaining value is cashable value that is provided back to the patron either as playing chips or a gaming voucher.

For example, assume that the patron has $300 in playing chips and $200 in outstanding markers. In that case, $200 of the playing chips represent non-cashable value and the remaining $100 of playing chips represent cashable value. In one possible scenario, the patron gives all $300 in chips to the pit clerk and tells the pit clerk to pay off all of his outstanding markers. In that case, the $200 non-cashable chip value is used to pay off the $200 in outstanding markers and the remaining $100 cashable chip value is provided back to the patron.

In one possible scenario, the patron retains $25 in chips, gives the remaining $275 in chips to the pit clerk, and tells the pit clerk to pay off all of his outstanding markers. In that case, the $200 non-cashable chip value is used to pay off the $200 in outstanding markers, and the remaining $75 cashable chip value is provided back to the patron either as playing chips or a gaming voucher. As such, between the $25 is retained chips and the $75 in returned value, the patron will have a total of $100 of cashable value.

In another possible scenario, the patron gives all $300 in chips to the pit clerk and tells the pit clerk to use only $75 to pay down his outstanding markers. In that case, after using $75 of non-cashable chip value to pay off $75 of the patron's $200 in outstanding markers, the patron will still have $125 in outstanding markers and is provided chips and/or a gaming voucher having a total of $125 in non-cashable value and a total of $100 in cashable value.

Whenever the patron leaves a gaming table with chips, he can use those chips to play at another gaming table. Alternatively, the patron can redeem those chips at a casino cage, where a cage clerk working at the cage will use the value of those chips and the identity of the patron to communicate with the marker server to update the patron's marker record. Here, too, after applying any non-cashable chip value to pay off any outstanding markers, any remaining cashable chip value is provided to the patron in cash or credit.

For play at a gaming table that can be funded using paper vouchers, the gaming table or a pit station near the gaming table will have a voucher reader that reads a first paper voucher and communicates with the ticket server to redeem the first paper voucher. Furthermore, for implementations in which the patrons can trade remaining playing credit (e.g., remaining playing chips) for paper vouchers, the gaming table or the pit station will have a voucher printer that communicates with the ticket server to create a new gaming voucher and then print a second paper voucher for that new gaming voucher. In some implementations, the ticket server communicates with the marker server to apply some or all of the remaining playing credit to pay down some or all of the patron's non-cashable markers. In those implementations, the second paper voucher represents cashable value. In other implementations, the ticket server does not communicate with the marker server to have any of the remaining playing credit pay down any of the patron's non-cashable markers. In those implementations, the second paper voucher may represent a combination of non-cashable value and cashable value, depending on the monetary value of the patron's non-cashable markers.

Although the use of non-cashable markers has been described in the context of a casino with physical gaming machines and/or physical gaming tables played at by patrons who are physically present at the casino, in other implementations, non-cashable markers can be used in an analogous manner to fund play by on-line patrons at virtual gaming machines and/or virtual gaming tables of an on-line casino. Here, too, a marker server and a voucher server similar if not identical to the ones described previously are used to support these implementations. In fact, in some implementations, the same marker and voucher servers simultaneously support both in-person and on-line gaming.

In some embodiments, the present disclosure is a computer-based gaming system for a casino having one or more gaming machines/tables. The system comprises a ticket server and a marker server, wherein the ticket server controls generation and redemption of gaming vouchers, wherein a gaming voucher can be used for play at a gaming machine/table, and the marker server controls granting of non-cashable markers to patrons of the casino, wherein a non-cashable marker provides non-cashable value to a patron. When a patron requests a non-cashable marker for an amount of non-cashable value, (a1) a message is transmitted to the marker server for the non-cashable marker for the patron; (a2) the marker server determines whether to grant the non-cashable marker for the patron; (a3) if the marker server determines to grant the non-cashable marker for the patron, then the marker server transmits a message for the ticket server to generate a first gaming voucher for the non-cashable marker; (a4) the ticket server creates the first gaming voucher representing a first monetary value corresponding to the non-cashable value; (a5) the ticket server transmits a message for the first gaming voucher; and (a6) the first gaming voucher is provided to the patron. When the patron uses the first gaming voucher for play at a gaming machine/table, (b1) a message is transmitted for the ticket server to redeem the first gaming voucher; (b2) the ticket server redeems the first gaming voucher and transmits a message identifying playing credit corresponding to the first monetary value represented by the first gaming voucher; and (b3) the patron is enabled to play at the gaming machine/table using the identified playing credit, wherein the system ensures that the non-cashable marker is paid back before redeeming any cashable value to the patron.

In at least some of the preceding embodiments, the first gaming voucher is a paper voucher.

In at least some of the preceding embodiments, the first gaming voucher is a virtual voucher.

In at least some of the preceding embodiments, when the patron attempts to redeem remaining playing credit, the system uses some or all of the monetary value of the remaining playing credit to pay back the non-cashable marker before providing any cashable value to the patron.

In at least some of the preceding embodiments, the system requires the patron's identity in order redeem the remaining playing credit.

In at least some of the preceding embodiments, the marker server determines how much of the remaining playing credit is non-cashable value that is applied to pay back at least part of the non-cashable marker for the patron and how much of the remaining playing credit is cashable value; the marker server transmits a message for the cashable value; and, if the cashable value is greater than zero, then the cashable value is provided to the patron.

In at least some of the preceding embodiments, if the remaining playing credit is represented by a second gaming voucher, then (i) a message is transmitted to the ticket server to redeem the second gaming voucher and (ii) the ticket server redeems the second gaming voucher and transmits a message for the marker server to pay back the non-cashable marker for the patron.

In at least some of the preceding embodiments, when the patron finishes play at the gaming machine/table with remaining playing credit, the system enables the patron to leave the gaming machine/table with monetary value corresponding to the remaining playing credit that the patron can use to fund play at another gaming machine/table of the casino.

In at least some of the preceding embodiments, the monetary value is represented by a second gaming voucher or by gaming chips.

In at least some of the preceding embodiments, when the patron finishes play at the gaming machine/table with remaining playing credit, the system applies some or all of the monetary value of the remaining playing credit to pay back some or all of the non-cashable marker.

In at least some of the preceding embodiments, if there is any remaining value after paying back some or all of the non-cashable marker, then the system provides the remaining value to the patron as represented by a second gaming voucher or by gaming chips that the patron can use to fund play at another gaming machine/table of the casino.

In at least some of the preceding embodiments, the system further comprises a kiosk, wherein, when the patron uses the kiosk to request the non-cashable marker for the amount of non-cashable value, (i) the kiosk transmits the message for the marker server for the non-cashable marker for the patron, (ii) the ticket server transmits the message for the first gaming voucher for the kiosk; and (iii) the kiosk provides the first gaming voucher to the patron. When the patron uses the kiosk to redeem a second gaming voucher having a second monetary value, (i) the kiosk transmits a message to the ticket server to redeem the second voucher; (ii) the ticket server redeems the second voucher and transmits a message for the marker server to pay back the non-cashable marker for the patron; (iii) the marker server determines how much of the second monetary value is non-cashable value that is applied to pay back at least part of the non-cashable marker for the patron and how much of the secondary monetary value is cashable value; (iv) the marker server transmits a message for the cashable value for the kiosk; and (v) if the cashable funds are greater than zero, then the kiosk provides the cashable value to the patron.

In at least some of the preceding embodiments, the kiosk requires the patron's identity in order to provide the first gaming voucher to the patron and to redeem the second gaming voucher for the patron.

In at least some of the preceding embodiments, the second gaming voucher is a paper voucher.

In at least some of the preceding embodiments, the second gaming voucher is a virtual voucher.

In at least some of the preceding embodiments, the system further comprises a casino cage, wherein, when the patron uses the casino cage to redeem remaining playing credit, (i) the marker server determines how much of the remaining playing credit is non-cashable value that is applied to pay back at least part of the non-cashable marker for the patron and how much of the remaining playing credit is cashable value; (ii) the marker server transmits a message for the cashable value for the cage; and (iii) if the cashable funds are greater than zero, then the cage provides the cashable value to the patron.

In at least some of the preceding embodiments, when the remaining playing credit is represented by a second gaming voucher, (i) the cage transmits a message to the ticket server to redeem the second gaming voucher and (ii) the ticket server redeems the second gaming voucher and transmits a message for the marker server to pay back the non-cashable marker for the patron.

In at least some of the preceding embodiments, the ticket server does not distinguish between gaming vouchers representing cashable value and gaming vouchers representing non-cashable value.

In at least some of the preceding embodiments, a gaming machine/table does not distinguish between playing credit corresponding to cashable value and playing credit corresponding to non-cashable value.

In at least some of the preceding embodiments, the system comprises at least one gaming machine capable of receiving the first gaming voucher as a first paper voucher for redemption and printing a second gaming voucher as a second paper voucher.

In at least some of the preceding embodiments, the system comprises at least one gaming table comprising a voucher reader capable of receiving the first gaming voucher as a first paper voucher for redemption and a voucher printer capable of printing a second gaming voucher as a second paper voucher.

In at least some of the preceding embodiments, the patron uses a casino app running on a mobile device to communicate with the system to one or more of (i) request the non-cashable marker for the amount of non-cashable value; (ii) use the first gaming voucher for gaming at the gaming machine/table; (iii) request a second gaming voucher for any remaining playing credit; and (iv) request redemption of the second gaming voucher.

In at least some of the preceding embodiments, the patron uses a casino app running on a mobile device to communicate with the system to (i) request the non-cashable marker for the amount of non-cashable value; (ii) use the first gaming voucher for gaming at the gaming machine/table; (iii) request the second gaming voucher for the remaining playing credit; and (iv) request redemption of the second gaming voucher.

In at least some of the preceding embodiments, the gaming machine/table is a physical gaming machine/table.

In at least some of the preceding embodiments, the gaming machine/table is a virtual gaming machine/table.

In some embodiments, the present disclosure is a method for gaming at a casino having a marker server, a ticket server, and one or more gaming machines/tables. The method comprises the marker server receiving a request for a non-cashable marker for a patron; the marker server determining whether to grant the non-cashable marker for the patron; if the marker server determines to grant the non-cashable marker for the patron, then the marker server transmitting a message for the ticket server to generate a first gaming voucher for the non-cashable marker; the ticket server creating the first gaming voucher representing a first monetary value corresponding to the non-cashable value; the ticket server transmitting a message for the first gaming voucher, which is provided to the patron; receiving the first gaming voucher from the patron at a gaming machine/table; transmitting a message for the ticket server to redeem the first gaming voucher; the ticket server redeeming the first gaming voucher and transmitting a message identifying playing credit corresponding to the first monetary value represented by the first gaming voucher; the gaming machine/table enabling the patron to play using the identified playing credit; and ensuring that the non-cashable marker is paid back before redeeming any cashable value to the patron.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A computer-based gaming system for a casino having a plurality of gaming machines/tables, the system comprising:
   a ticket server; and
   a marker server, wherein:
     the ticket server controls generation and redemption of
       a plurality of gaming vouchers for a plurality of patrons of the casino, wherein a gaming voucher can be used for play at any of the plurality of gaming machines/tables of the casino;

the marker server controls granting of a plurality of non-cashable markers to a plurality of patrons of the casino and granting of a plurality of cashable markers to a plurality of patrons of the casino, wherein non-cashable markers provide non-cashable value to patrons and cashable markers provide cashable value to patrons, for each of the plurality of non-cashable markers:

(a) when a patron requests a non-cashable marker for an amount of non-cashable value:
 (a1) a message is transmitted to the marker server for the non-cashable marker for the patron;
 (a2) the marker server determines whether to grant the non-cashable marker for the patron;
 (a3) if the marker server determines to grant the non-cashable marker for the patron, then the marker server transmits a message for the ticket server to generate a first gaming voucher for the non-cashable marker;
 (a4) the ticket server generates the first gaming voucher representing a first monetary value corresponding to the non-cashable value;
 (a5) the ticket server transmits a message for the first gaming voucher; and
 (a6) the first gaming voucher is provided to the patron;

(b) when the patron uses the first gaming voucher for play at a gaming machine/table:
 (b1) a message is transmitted for the ticket server to redeem the first gaming voucher;
 (b2) the ticket server redeems the first gaming voucher and transmits a message identifying playing credit corresponding to the first monetary value represented by the first gaming voucher; and
 (b3) the patron is enabled to play at the gaming machine/table using the identified playing credit, wherein the system ensures that the non-cashable marker is paid back before redeeming any cashable value to the patron; and (c) when the patron attempts to redeem remaining playing credit, the system uses some or all of the monetary value of the remaining playing credit to pay back the non-cashable marker before providing any cashable value to the patron.

2. The system of claim 1, wherein the first gaming voucher is a paper voucher.

3. The system of claim 1, wherein the first gaming voucher is a virtual voucher.

4. The system of claim 1, wherein the system requires the patron's identity in order redeem the remaining playing credit.

5. The system of claim 1, wherein:
the marker server determines how much of the remaining playing credit is non-cashable value that is applied to pay back at least part of the non-cashable marker for the patron and how much of the remaining playing credit is cashable value;
the marker server transmits a message for the cashable value; and
if the cashable value is greater than zero, then the cashable value is provided to the patron.

6. The system of claim 5, wherein, if the remaining playing credit is represented by a second gaming voucher, then:
a message is transmitted to the ticket server to redeem the second gaming voucher; and
the ticket server redeems the second gaming voucher and transmits a message for the marker server to pay back the non-cashable marker for the patron.

7. The system of claim 1, wherein, when the patron finishes play at the gaming machine/table with remaining playing credit, the system enables the patron to leave the gaming machine/table with monetary value corresponding to the remaining playing credit that the patron can use to fund play at another gaming machine/table of the casino.

8. The system of claim 7, wherein the monetary value is represented by a second gaming voucher or by gaming chips.

9. The system of claim 1, wherein, when the patron finishes play at the gaming machine/table with remaining playing credit, the system applies some or all of the monetary value of the remaining playing credit to pay back some or all of the non-cashable marker.

10. The system of claim 9, wherein, if there is any remaining value after paying back some or all of the non-cashable marker, then the system provides the remaining value to the patron as represented by a second gaming voucher or by gaming chips that the patron can use to fund play at another gaming machine/table of the casino.

11. The system of claim 1, further comprising a kiosk, wherein:
(a) when the patron uses the kiosk to request the non-cashable marker for the amount of non-cashable value:
 (a1) the kiosk transmits the message for the marker server for the non-cashable marker for the patron;
 (a5) the ticket server transmits the message for the first gaming voucher for the kiosk; and
 (a6) the kiosk provides the first gaming voucher to the patron;
(c) when the patron uses the kiosk to redeem a second gaming voucher having a second monetary value:
 (c1) the kiosk transmits a message to the ticket server to redeem the second voucher;
 (c2) the ticket server redeems the second voucher and transmits a message for the marker server to pay back the non-cashable marker for the patron;
 (c3) the marker server determines how much of the second monetary value is non-cashable value that is applied to pay back at least part of the non-cashable marker for the patron and how much of the secondary monetary value is cashable value;
 (c4) the marker server transmits a message for the cashable value for the kiosk; and
 (c5) if the cashable funds are greater than zero, then the kiosk provides the cashable value to the patron.

12. The system of claim 11, wherein the kiosk requires the patron's identity in order to provide the first gaming voucher to the patron and to redeem the second gaming voucher for the patron.

13. The system of claim 11, wherein the second gaming voucher is a paper voucher.

14. The system of claim 11, wherein the second gaming voucher is a virtual voucher.

15. The system of claim 1, further comprising a casino cage, wherein, when the patron uses the casino cage to redeem remaining playing credit:
the marker server determines how much of the remaining playing credit is non-cashable value that is applied to pay back at least part of the non-cashable marker for the patron and how much of the remaining playing credit is cashable value;

the marker server transmits a message for the cashable value for the cage; and if the cashable funds are greater than zero, then the cage provides the cashable value to the patron.

16. The system of claim 15, wherein, when the remaining playing credit is represented by a second gaming voucher:

the cage transmits a message to the ticket server to redeem the second gaming voucher; and the ticket server redeems the second gaming voucher and transmits a message for the marker server to pay back the non-cashable marker for the patron.

17. The system of claim 1, wherein the ticket server does not distinguish between gaming vouchers representing cashable value and gaming vouchers representing non-cashable value.

18. The system of claim 1, wherein a gaming machine/table does not distinguish between playing credit corresponding to cashable value and playing credit corresponding to non-cashable value.

19. The system of claim 1, comprising at least one gaming machine capable of receiving the first gaming voucher as a first paper voucher for redemption and printing a second gaming voucher as a second paper voucher.

20. The system of claim 1, comprising at least one gaming table comprising a voucher reader capable of receiving the first gaming voucher as a first paper voucher for redemption and a voucher printer capable of printing a second gaming voucher as a second paper voucher.

21. The system of claim 1, wherein the patron uses a casino app running on a mobile device to communicate with the system to one or more of:

request the non-cashable marker for the amount of non-cashable value;

use the first gaming voucher for gaming at the gaming machine/table;

request a second gaming voucher for any remaining playing credit; and request redemption of the second gaming voucher.

22. The system of claim 21, wherein the patron uses a casino app running on a mobile device to communicate with the system to:

request the non-cashable marker for the amount of non-cashable value;

use the first gaming voucher for gaming at the gaming machine/table;

request the second gaming voucher for the remaining playing credit; and request redemption of the second gaming voucher.

23. The system of claim 1, wherein the gaming machine/table is a physical gaming machine/table.

24. The system of claim 1, wherein the gaming machine/table is a virtual gaming machine/table.

25. The marker server of claim 1.

26. The kiosk of claim 11.

27. A method for gaming at a casino having a marker server, a ticket server, and a plurality of gaming machines/tables, wherein the marker server (i) grants a plurality of non-cashable markers to a plurality of patrons of the casino and (ii) grants of a plurality of cashable markers to a plurality of patrons of the casino, wherein non-cashable markers provide non-cashable value to patrons and cashable markers provide cashable value to patrons, wherein, for each of the plurality of non-cashable markers, the method comprising:

the marker server receiving a request for a non-cashable marker for a patron;

the marker server determining whether to grant the non-cashable marker for the patron;

if the marker server determines to grant the non-cashable marker for the patron, then the marker server transmitting a message for the ticket server to generate a first gaming voucher for the non-cashable marker;

the ticket server generating the first gaming voucher representing a first monetary value corresponding to the non-cashable value;

the ticket server transmitting a message for the first gaming voucher, which is provided to the patron;

a gaming machine/table receiving the first gaming voucher from the patron;

the gaming machine/table transmitting a message for the ticket server to redeem the first gaming voucher;

the ticket server redeeming the first gaming voucher and transmitting to the gaming machine/table a message identifying playing credit corresponding to the first monetary value represented by the first gaming voucher;

the gaming machine/table enabling the patron to play using the identified playing credit; and the marker server using some or all of the monetary value of any remaining playing credit to pay back the non-cashable marker before any cashable value is provided to the patron, thereby ensuring that the non-cashable marker is paid back before redeeming any cashable value to the patron.

* * * * *